(12) United States Patent
Singh

(10) Patent No.: US 8,930,376 B2
(45) Date of Patent: Jan. 6, 2015

(54) SEARCH RESULT ABSTRACT QUALITY USING COMMUNITY METADATA

(75) Inventor: Vikash K. Singh, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 319 days.

(21) Appl. No.: 12/032,416

(22) Filed: Feb. 15, 2008

(65) Prior Publication Data

US 2009/0210381 A1  Aug. 20, 2009

(51) Int. Cl.
*G06F 17/30* (2006.01)

(52) U.S. Cl.
CPC .... *G06F 17/30719* (2013.01); *G06F 17/30884* (2013.01); *G06F 17/30696* (2013.01)
USPC ........................................................ 707/748

(58) Field of Classification Search
USPC ............................ 707/999.102, 705, 736, 748
See application file for complete search history.

(56) References Cited

U.S. PATENT DOCUMENTS

| 2005/0216457 | A1* | 9/2005 | Walther et al. | 707/4 |
| 2007/0266022 | A1* | 11/2007 | Frumkin et al. | 707/5 |
| 2008/0313111 | A1* | 12/2008 | Padovitz et al. | 706/12 |
| 2009/0187516 | A1* | 7/2009 | Kanungo et al. | 706/12 |
| 2009/0198667 | A1* | 8/2009 | Groeneveld et al. | 707/5 |

* cited by examiner

*Primary Examiner* — Jensen Hu
(74) *Attorney, Agent, or Firm* — Pillsbury Winthrop Shaw Pittman LLP

(57) ABSTRACT

A system and method is described herein that uses community-based metadata to improve the manner by which a search engine generates an abstract for a document, such as a Web page. The community-based metadata may comprise, for example, tags or descriptors associated with the document by users of a Web service, such as users of a social bookmarking Web service. By using community-based metadata to help identify text fragments within a document that are most suitable for generating the abstract, an embodiment of the present invention generates an abstract that more accurately represents relevant document content as compared to conventional abstract generation algorithms.

28 Claims, 9 Drawing Sheets

SEARCH RESULT ABSTRACT QUALITY USING COMMUNITY METADATA

BACKGROUND OF THE INVENTION

1. Field of the Invention

The present invention generally relates to search engines. In particular, the present invention relates to techniques by which search engines generate abstracts to represent the content of documents, such as Web pages, identified during a search.

2. Background

A search engine is an information retrieval system designed to help users find information stored on a computer system. Search engines help to minimize the amount of time required to find information as well as the amount of information that must be reviewed by a user of the engine. The most public, visible form of a search engine is an Internet search engine that searches for information on the World Wide Web.

A conventional Internet search engine is configured to receive a user query in the form of one or more search terms and to identify relevant Web pages based on the query. A list of the identified Web pages, typically ordered from most relevant to least relevant, is then presented to the user via the user's Web browser. By way of example, FIG. 1 depicts a user interface screen 100 of a conventional Web browser that displays a list of search results associated with the user query "digital camera."

As shown in FIG. 1, information about each Web page identified during the search is presented to the user in a structured format. The structured format includes a title associated with the Web page, an abstract that summarizes the content of the Web page, and a Uniform Resource Locator (URL) associated with the Web page. For example, as shown in FIG. 1, a particular search result includes a title 102, an abstract 104, and a URL 106, each of which is associated with the same Web page.

The abstract generated by the search engine is intended to provide a concise summary of the content of a Web page in a manner that focuses on information that is most relevant to the user query. By reading the abstract, the user should be able to determine whether the identified Web page actually includes content in which the user is interested. In contrast, Web page titles and URLs rarely include enough descriptive information to make this determination. Consequently, abstracts form a critical part of the search results, particularly when the user query is very general in nature. The failure to provide a clear and coherent abstract that accurately represents relevant Web page content can significantly impair the user experience associated with a particular search engine.

However, there are numerous challenges that must be dealt with in order to generate a high-quality abstract. For example, although abstracts consume a large amount of screen real estate relative to other portions of the search results, they must still be limited in size to ensure that a reasonable number of Web pages can be listed in the browser window. For example, some search engines limit abstracts to approximately 150 characters. Abstract generation algorithms must therefore be programmed to use this limited space intelligently such that only the information that best summarizes the Web page content and that is most relevant to the user query is presented. This in turn means that the abstract generation algorithm must be able to locate such information within the Web page.

Furthermore, once an abstract generation algorithm has located such information within the Web page, it must also assemble that information in a form that is easily understood by the user and that complies with the size constraints imposed by the user interface. This can be difficult, for example, if the content being used to build the abstract is too lengthy or if the content includes disconnected text fragments that are obtained from different portions of the Web page.

Additionally, search engines typically generate abstracts at run time so that the abstract generation algorithm can take into account the search terms included in the query. Since abstract generation occurs at run time, it must be performed in a fast and efficient manner. This imposes a significant constraint on the complexity of the abstract generation algorithm used by the search engine.

What is needed then is an abstract generation algorithm for a search engine that is capable of generating an abstract that accurately represents relevant Web page content. To this end, the desired abstract generation algorithm should be able to locate information within a Web page that best summarizes the Web page content and that is also most relevant to a user query. The desired abstract generation algorithm should also be able to assemble such information in a form that is easily understood by the user and that complies with size constraints imposed by a user interface. Finally, the desired abstract generation algorithm should be programmed to operate in a fast and efficient manner that satisfies run time constraints associated with the search engine.

BRIEF SUMMARY OF THE INVENTION

A system and method is described herein that uses community-based metadata to improve the manner in which an abstract is generated for a document, such as a Web page. The community-based metadata may comprise, for example, tags or descriptors associated with the document by one or more users of a service, such as one or more users of a social bookmarking Web service.

By using community-based metadata to help identify text fragments within a document that are most suitable for generating the abstract, an embodiment of the present invention generates an abstract that more accurately represents relevant document content as compared to conventional abstract generation algorithms. As will also be described herein, an embodiment of the present invention assembles the identified text fragments in a form that is easily understood by the user and that complies with size constraints imposed by a user interface. An embodiment of the present invention may also be programmed to operate in a fast and efficient manner that satisfies run time constraints associated with the search engine.

In particular, a method for generating an abstract associated with a document, such as a Web page, is described herein. The document may be identified responsive to a user query. In accordance with the method, community-generated metadata associated with the document is obtained. Additionally, textual content of the document is divided into a series of fragments. One or more fragments from the series of fragments are then selected based at least in part on the community-generated metadata. The selected fragment(s) are then used to generate the abstract.

In accordance with the foregoing method, selecting the one or more fragments from the series of fragments based at least in part on the community-generated metadata may include several steps. First, a measure of similarity between the community-generated metadata and each fragment in the series of fragments is determined. Then, a score is calculated for each fragment in the series of fragments based at least in part on the measure of similarity between the community-generated metadata and the fragment. Then, the one or more fragments from the series of fragments are selected based at least in part on the score associated with each fragment in the series of fragments.

The score calculated for each fragment in the series of fragments may also take into account one or more of: a measure of similarity between a title associated with the document and the fragment, a measure of similarity between a Uniform Resource Locator (URL) associated with the document and the fragment, a measure of similarity between search terms used to identify the document and the fragment, and a weighting factor associated with the position of the fragment in the series of fragments.

Determining a measure of similarity between the community-generated metadata and each fragment in the series of fragments may include determining a measure of similarity between a plurality of tags associated with the document and a fragment in the series of fragments, wherein each tag in the plurality of tags comprises a text descriptor assigned by one or more users to the document.

Determining a measure of similarity between the plurality of tags associated with the document and the fragment may include a number of steps. First, the tags are organized into unique pairs. Then, related tags associated with each of the unique pairs are obtained to generate an expanded set of tags corresponding to each of the unique pairs. A measure of similarity is then determined between each expanded set of tags and the fragment to generate a similarity score for each of the unique pairs. The similarity scores for each of the unique pairs are then multiplied together. In a further embodiment, a frequency of use associated with each tag in the plurality of tags is obtained and the similarity score for each of the unique pairs is weighted based on the frequency of use associated with each tag in the unique pair.

In further accordance with the foregoing method, selecting the one or more fragments from the series of fragments based at least in part on the score associated with each fragment may include selecting one or more fragments from the series of fragments that maximize a sum of the scores associated with the selected fragment(s) subject to the condition that a sum of a number of characters in the selected fragment(s) plus a penalty amount associated with selecting non-contiguous fragments in the series of fragments does not exceed a predetermined abstract length.

A system is also described herein. The system includes a database and a search engine. The database stores community-generated metadata associated with a plurality of documents. The search engine includes a document identifier, an abstract generator and user interface logic. The document identifier is configured to identify a document, such as a Web page, responsive to a user query. The abstract generator is configured to obtain community-generated metadata associated with the identified document from the database, to divide textual content of the identified document into a series of fragments, to select one or more fragments from the series of fragments based at least in part on the obtained community-generated metadata, and to generate an abstract associated with the identified document from the selected fragment(s). The user interface logic is configured to present the abstract associated with the identified document to a user. The obtained community-based metadata may include a plurality of tags associated with the identified document, wherein each tag in the plurality of tags comprises a text descriptor assigned by one or more users to the identified document.

In one embodiment, the abstract generator is configured to determine a measure of similarity between the obtained community-generated metadata and each fragment in the series of fragments, to calculate a score for each fragment in the series of fragments based at least in part on the measure of similarity between the obtained community-generated metadata and the fragment, and to select one or more fragments from the series of fragments based at least in part on the score associated with each fragment in the series of fragments.

The abstract generator may be configured to calculate the score for each fragment in the series of fragments by also taking into account one or more of: a measure of similarity between a title associated with the identified document and the fragment, a measure of similarity between a URL associated with the identified document and the fragment, a measure of similarity between search terms used to identify the identified document and the fragment, and a weighting factor associated with the position of the fragment in the series of fragments.

In an embodiment in which the obtained community-based metadata comprises a plurality of tags associated with the identified document, the abstract generator may be configured to determine a measure of similarity between the plurality of tags and a fragment by organizing the plurality of tags into unique pairs, obtaining related tags associated with each of the unique pairs to generate an expanded set of tags corresponding to each of the unique pairs, determining a measure of similarity between each expanded set of tags and the fragment to generate a similarity score for each of the unique pairs, and multiplying the similarity scores for each of the unique pairs together. The abstract generator may be further configured to obtain a frequency of use associated with each tag in the plurality of tags and to weight the similarity score for each of the unique pairs based on the frequency of use associated with each tag in the unique pair.

In a further embodiment, the abstract generator may be configured to select the one or more fragments from the series of fragments that maximize a sum of the scores associated with the selected fragment(s) subject to the condition that a sum of a number of characters in the selected fragment(s) plus a penalty amount associated with selecting non-contiguous fragments in the series of fragments does not exceed a predetermined abstract length.

A computer program product is also described herein. The computer program product includes a computer-readable medium having computer program logic recorded thereon for enabling a processing unit to generate an abstract associated with a document, such as a Web page. The computer program logic includes first means, second means, third means and fourth means. The first means are programmed to enable the processing unit to obtain community generated metadata associated with the document. The second means are programmed to enable the processing unit to divide textual content of the document into a series of fragments. The third means are programmed to enable the processing unit to select one or more fragments from the series of fragments based at least in part on the community-generated metadata. The fourth means are programmed to enable the processing unit to use the selected fragment(s) to generate the abstract.

The foregoing computer program logic may further include means for enabling the processing unit to identify the document responsive to a user query.

In accordance with the foregoing computer program product, the third means may include means for enabling the processing unit to determine a measure of similarity between the community-generated metadata and each fragment in the series of fragments, means for enabling the processing unit to calculate a score for each fragment in the series of fragments based at least in part on the measure of similarity between the community-generated metadata and the fragment, and means for enabling the processing unit to select one or more fragments from the series of fragments based at least in part on the score associated with each fragment in the series of fragments.

The means for enabling the processing unit to calculate a score for each fragment in the series of fragments may also be programmed to enable the processing unit to take into account one or more of: a measure of similarity between a title associated with the document and the fragment, a measure of similarity between a URL associated with the document and the fragment, a measure of similarity between search terms used to identify the document and the fragment, and a weighting factor associated with the position of the fragment in the series of fragments.

In one embodiment, the means for enabling the processing unit to determine a measure of similarity between the community-generated metadata and each fragment in the series of fragments includes means for enabling the processing unit to determine a measure of similarity between a plurality of tags associated with the document and a fragment, wherein each tag in the plurality of tags comprises a text descriptor assigned by one or more users to the document.

The means for enabling the processing unit to determine a measure of similarity between the plurality of tags associated with the document and the fragment may include means for enabling the processing unit to organize the plurality of tags into unique pairs, means for enabling the processing unit to obtain related tags associated with each of the unique pairs to generate an expanded set of tags corresponding to each of the unique pairs, means for enabling the processing unit to determine a measure of similarity between each expanded set of tags and the fragment to generate a similarity score for each of the unique pairs, and means for enabling the processing unit to multiply the similarity scores for each of the unique pairs together. The means for enabling the processor to determine a measure of similarity between the plurality of tags associated with the document and the fragment may further include means for enabling the processing unit to obtain a frequency of use associated with each tag in the plurality of tags and means for enabling the processing unit to weight the similarity score for each of the unique pairs based on the frequency of use associated with each tag in the unique pair.

In a further embodiment, the means for enabling the processing unit to select the one or more fragments from the series of fragments based at least in part on the score associated with each fragment includes means for enabling the processing unit to select one or more fragments from the series of fragments that maximize a sum of the scores associated with the selected fragment(s) subject to the condition that a sum of a number of characters in the selected fragment(s) plus a penalty amount associated with selecting non-contiguous fragments in the series of fragments does not exceed a predetermined abstract length.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
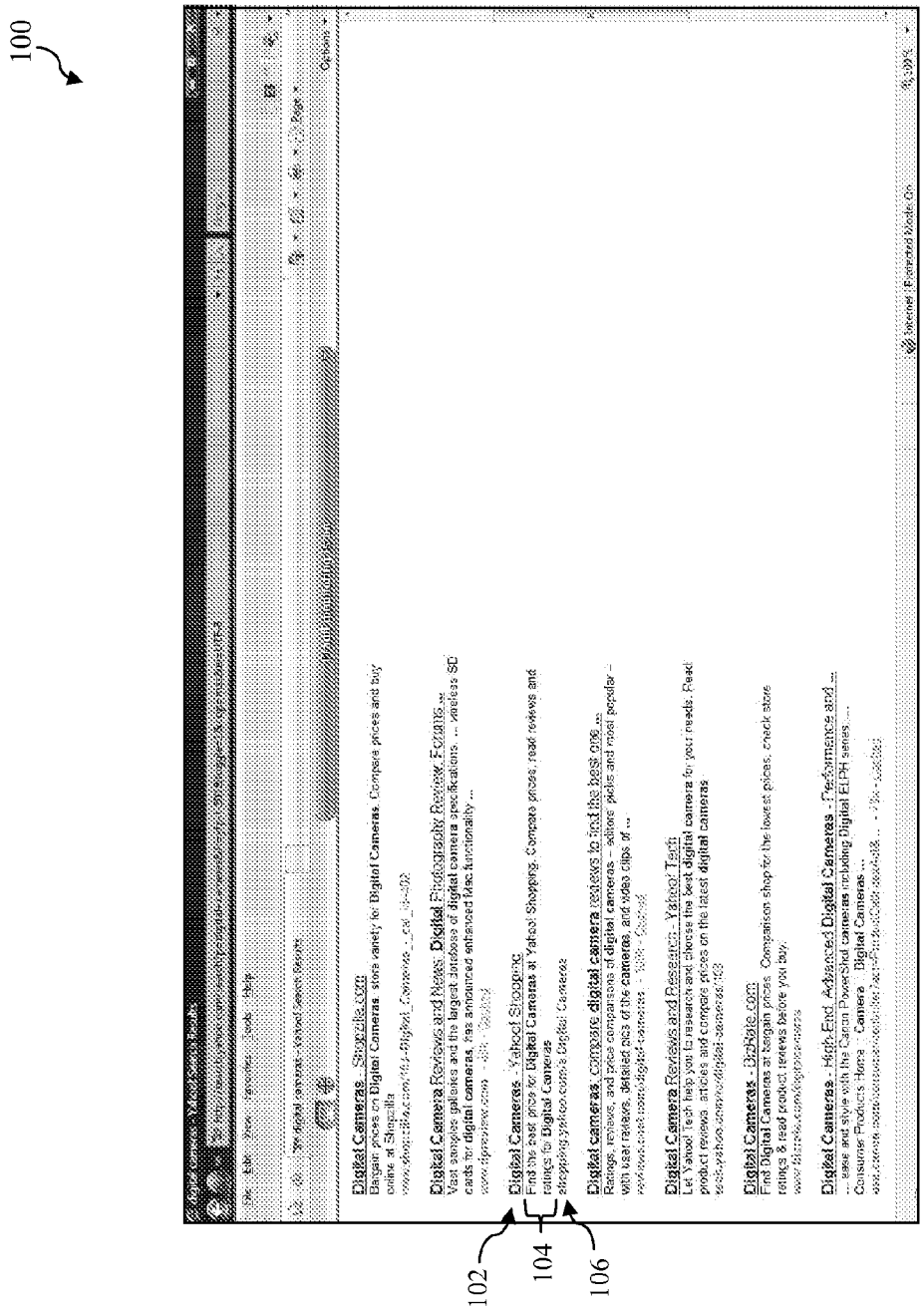
FIG. 1 depicts a user interface screen of a conventional Web browser.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example Operating Environment

Figure 2:
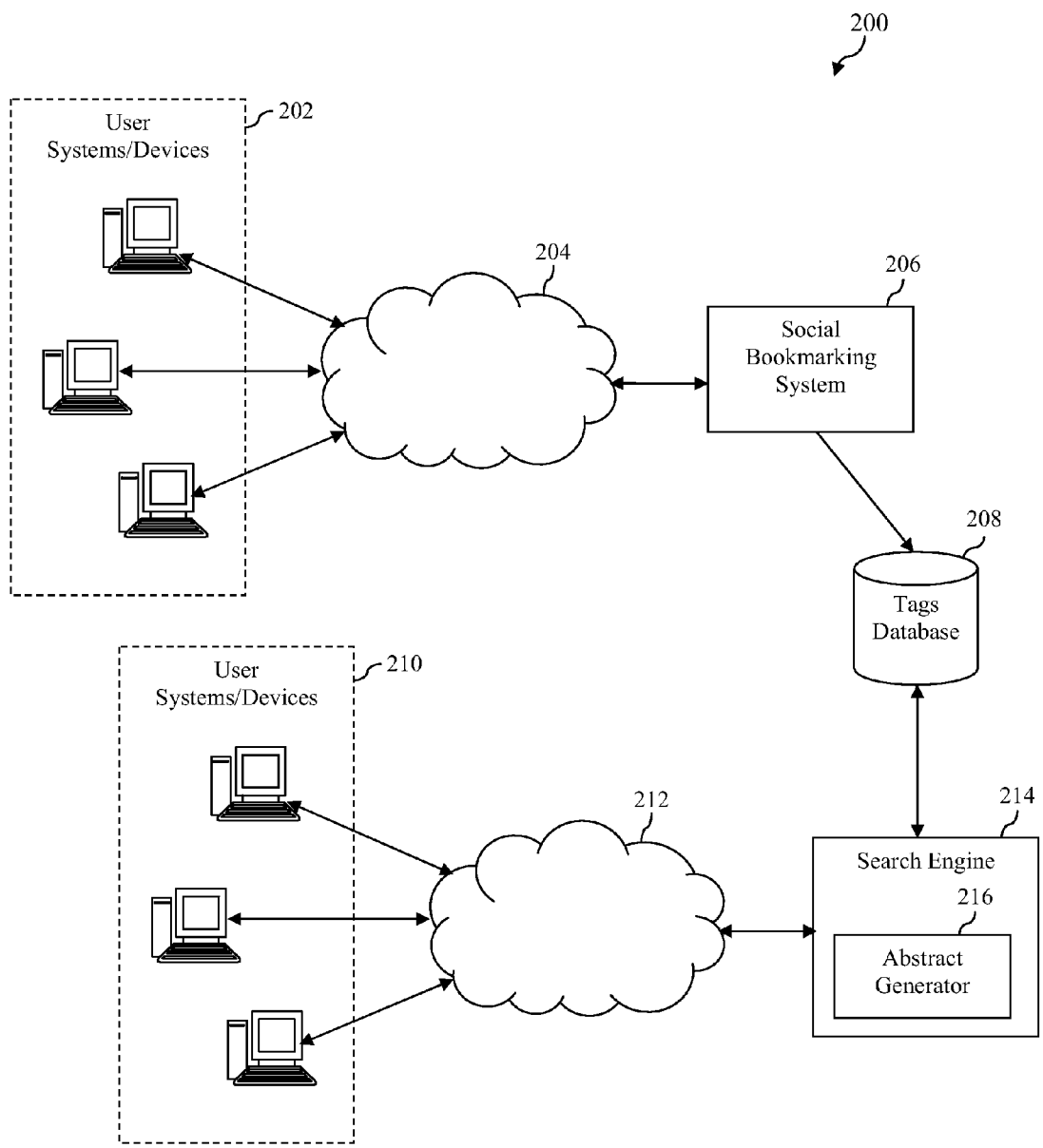
FIG. 2 is a block diagram of an exemplary system in which an embodiment of the present invention may be implemented.

FIG. 2 is a block diagram of an exemplary system 200 in which an embodiment of the present invention may be implemented. As shown in FIG. 2, system 200 includes a social bookmarking system 206 that is communicatively connected to a plurality of user systems/devices 202 via a network 204 and a search engine 214 that is communicatively connected to a plurality of user systems/devices 210 via a network 212. Each of these elements of system 200 will now be described.

User systems/devices 202 and 210 are intended to represent processor-based computer systems or devices that are configured to allow a user to browse the Internet. To this end, each user system/device is configured to execute a Web browser that allows a user to access Web pages via the Internet in a well-known fashion. Each user system/device may comprise, for example and without limitation, a personal computer, laptop computer, cellular telephone, personal digital assistant, or the like. In system 200, networks 204 and 212 are each intended to represent a portion of the Internet.

Social bookmarking system 206 is a computer system configured to allow users of user systems/devices 202 to store, organize, search and manage bookmarks associated with Web pages on the Internet. In particular, social bookmarking system 206 allows such users to save links to Web pages that the users want to remember and/or share in a central location. Social bookmarking system 206 may allow such bookmarks to be privately stored or shared with other users. One example of a social bookmarking system is del.icio.us (http://del.icio.us), owned by Yahoo! Inc. of Sunnyvale, Calif.

Social bookmarking system 206 is further configured to permit users to organize bookmarks with descriptors called "tags." Tags are user-defined terms used to describe the content of a particular Web page. This feature enables social bookmarking system 206 to perform tag-based classification of bookmarked Web pages. Such tag-based classification enables a user to search for bookmarks associated with a chosen tag and also enables social bookmarking system 206 to identify related Web pages based on tags.

The tags defined by the users of social bookmarking system 206 thus comprise community-generated metadata that describes the content of bookmarked Web pages. Because such tags are created by humans, they may provide a more accurate description of Web page content than conventional software programs that are designed to algorithmically perform the same function. Social bookmarking system 206 is also configured to determine and store the number of unique users that have associated a particular tag with a given Web page. Thus, the relatedness of a given tag to a particular Web page can be measured by the frequency with which that tag has been applied to that Web page.

In accordance with an embodiment of the present invention, the tags collected by social bookmarking system 206, an identification of the Web pages with which they are associated, and the number of unique users that have associated a particular tag with a given Web page are stored in a tags database 208, which is made accessible to search engine 214. Tags database 208 may be periodically updated or replaced to more accurately represent the data currently maintained by social bookmarking 206.

Search engine 214 is an information retrieval system designed to help users find information on the Internet. Search engine 214 is configured to receive a user query comprising one or more search terms from any of user systems/devices 210 and to identify relevant Web pages based on the query. Search engine 214 is further configured to provide a list of the identified Web pages, ordered from most relevant to least relevant, to a user via a Web browser executing on the appropriate user system/device. For each identified Web page, search engine 214 is configured to provide a title associated with the Web page, an abstract that summarizes the content of the Web page, and a Uniform Resource Locator (URL) associated with the Web page.

As shown in FIG. 2, search engine 214 includes an abstract generator 216 that is configured to generate the abstract for each identified Web page. As will be described herein, abstract generator 216 is configured to access tags database 208 and to use the tags and associated information stored therein to improve the manner in which abstracts are generated. In particular, abstract generator 216 is configured to use the tags and associated information to help identify text fragments within a Web page that are most suitable for generating the abstract. This enables abstract generator 216 to generate an abstract that more accurately represents relevant document content as compared to conventional abstract generators.

As will also be described herein, abstract generator 216 is configured to assemble the identified text fragments in a form that is easily understood by the user and that complies with size constraints imposed by a user interface. Abstract generator 216 may also be programmed to operate in a fast and efficient manner that satisfies run time constraints associated with the search engine. A more detailed description of abstract generator 216 will be provided in the following section.

It is noted that system 200 is described herein by way of example only and is not intended to limit the present invention. As will be appreciated by persons skilled in the relevant art(s) based on the teachings provided herein, the present invention may be implemented in operating environments other than that shown in FIG. 2.

Figure 3:
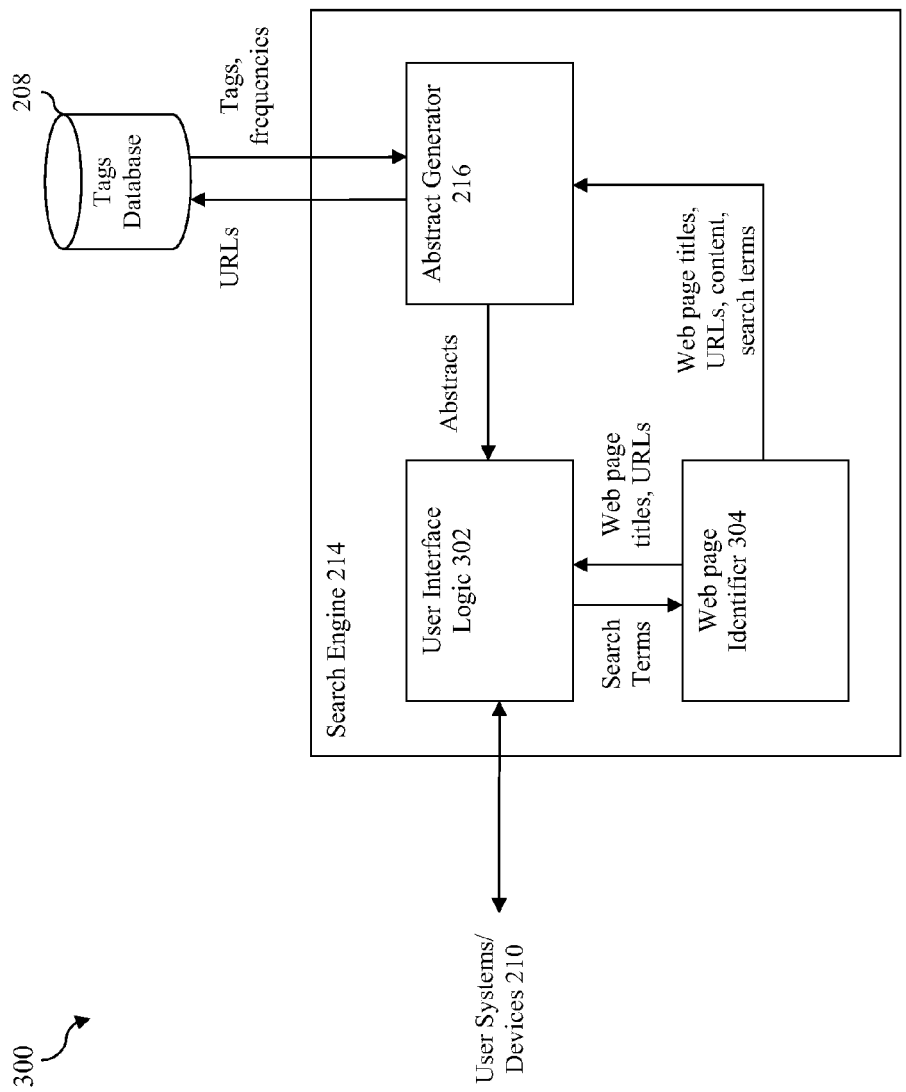
FIG. 3 is a block diagram of a search engine that includes an abstract generator in accordance with an embodiment of the present invention.

B. Abstract Generation in Accordance with an Embodiment of the Present Invention FIG. 3 is a block diagram 300 that depicts search engine 214 of FIG. 2 in more detail. As shown in FIG. 3, search engine 214 includes a number of interconnected components including user interface logic 302, a Web page identifier 304 and an abstract generator 216. In an embodiment, each of these components is implemented in software running on one or more servers, although the invention is not so limited. Each of these components will now be described.

User interface logic 302 is a component that is configured to present a user of a remote user system/device (such as a user of any of user systems/devices 210) with an interface by which to interact with search engine 214. In particular, user interface logic 302 is configured to present the user with an interface by which to enter one or more search terms to be used to execute a search. User interface logic 302 is also configured to present the user with an interface by which the user can review results of the search. As noted above, these results are provided as a list of Web pages, ordered from most relevant to least relevant, wherein a title, abstract and URL are provided for each Web page in the list. In an embodiment, the interfaces presented by user interface logic 302 are graphical user interfaces (GUIs). These GUIs may be embodied in Web pages that are displayed within a user's Web browser.

Web page identifier 304 is configured to receive the search terms associated with a user query from user interface logic 302 and to identify Web pages that are relevant to the search terms. To perform this function, Web page identifier 304 may access one or more databases of Web page content (not shown in FIG. 3). Web page identifier 304 is further configured to provide information about the identified Web pages to user interface logic 302 for presentation to a user. As shown in FIG. 3, this information includes titles and URLs associated with the identified Web pages. Web page identifier 304 is also configured to provide information about the identified Web pages to abstract generator 216. As shown in FIG. 3, the information provided to abstract generator 216 includes the titles and URLs associated with the identified Web pages, the search terms used to identify the identified Web pages, as well as the actual text content of the identified Web pages.

Abstract generator 216 is configured to receive the aforementioned information from Web page identifier 304 and to use that information to generate an abstract for each identified Web page. To perform this function, abstract generator 216 also obtains tags corresponding to each identified Web page, along with related information, from tags database 208 whenever such information is available. To obtain tags corresponding to an identified Web page, abstract generator 216 is configured to search tags database 208 for a URL or other unique identifier of the identified Web page. If a match is found, then abstract generator 216 obtains tags that have been stored in association with the identified Web page from tags database 208, as well as information relating to the number of unique users that assigned each tag to the identified Web page. This information is also referred to herein as the frequency of use of each tag.

Abstract generator 216 is further configured to provide each abstract generated for an identified Web page to user interface logic 302 so that the abstract can be presented along with the Web page title and URL to a user as a part of the search results.

Figure 4:
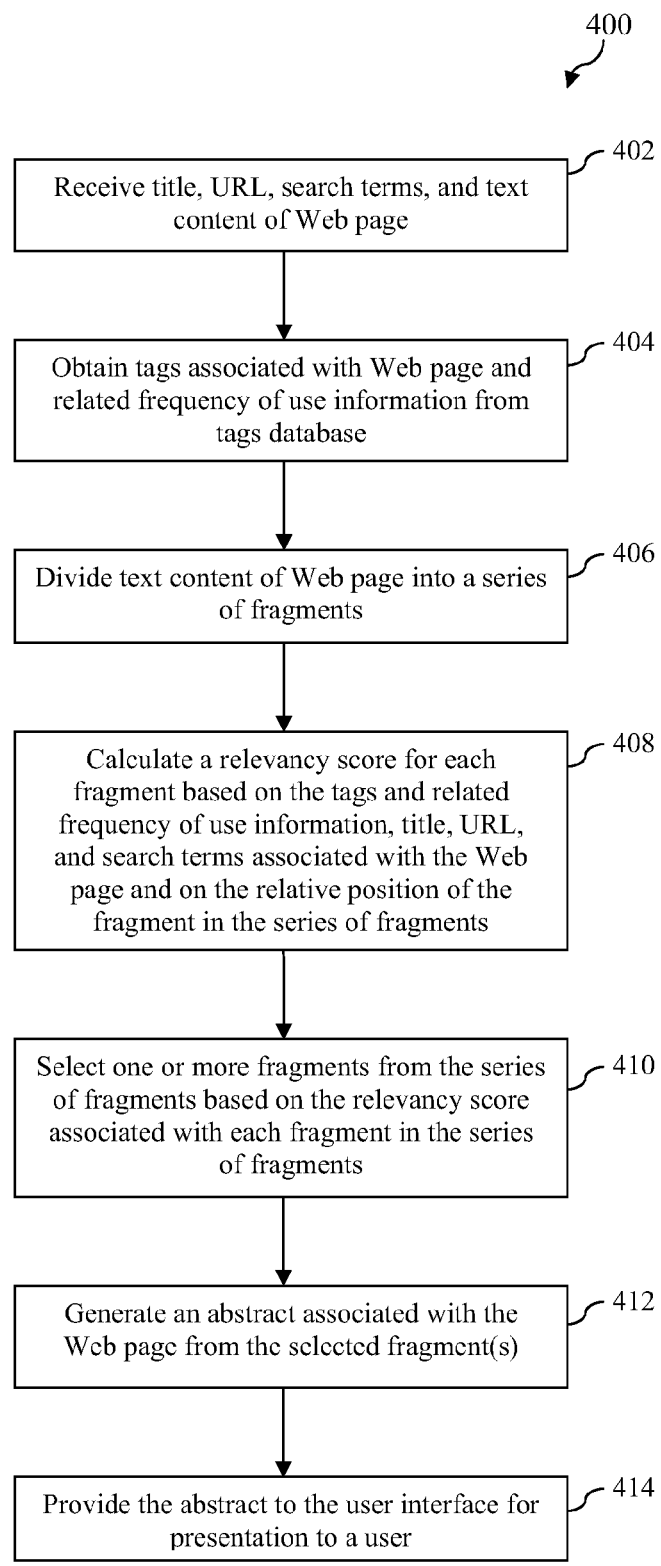
FIG. 4 depicts a flowchart of a method for generating an abstract associated with a Web page in accordance with an embodiment of the present invention.

FIG. 4 depicts a flowchart 400 of a method by which abstract generator 216 may generate an abstract for a Web page in accordance with an embodiment of the present invention. The method of flowchart 400 will now be described with continued reference to the components of search engine 214 as described above in reference to FIG. 2. However, the method is not limited to that implementation.

As shown in FIG. 4, the method of flowchart 400 begins at step 402, in which abstract generator 216 receives from Web page identifier 304 a title and URL associated with a Web page, search terms used to identify the Web page, and the text content of the Web page itself.

At step 404, abstract generator 216 obtains tags associated with the Web page and related frequency of use information from tags database 208. As noted above, abstract generator 216 may perform this step by searching tags database for a URL or other unique identifier associated with the Web page and by accessing information associated with the unique identifier in tags database 208 when a match is found.

At step 406, abstract generator 216 divides the text content of the Web page into a series of discrete fragments. In one embodiment, each fragment comprises a sentence. However, the invention is not so limited, and each fragment may comprise a predefined number of words, a paragraph, or some other discrete portion of the text content of the Web page.

At step 408, abstract generator 216 calculates a relevancy score for each fragment in the series of fragments. The relevancy score is intended to provide a measure of how relevant a particular fragment is to the subject matter of the Web page and to the search terms used in the user query. In one embodiment, the relevancy score is calculated based on the tags associated with the Web page and related frequency of use information, the title and URL associated with the Web page, the search terms used to identify the Web page, and the relative position of the fragment in the series of fragments. One method by which the relevancy score may be calculated will be described in more detail below.

At step 410, abstract generator 216 selects one or more fragments from the series of fragments based on the relevancy score associated with each fragment in the series of fragments. A particular method for performing this step will be described in more detail below.

At step 412, abstract generator 216 uses the selected fragment(s) to generate an abstract associated with the Web page. This step may include, for example, combining two or more selected fragments to generate the abstract.

At step 414, abstract generator 216 provides the abstract generated in step 412 to user interface logic 302 for presentation to a user. As noted above, user interface logic 302 presents the abstract along with the title and URL associated with the Web page to the user as part of a list of search results.

The foregoing method advantageously includes tags in determining which fragments of Web page text are the most relevant for the purposes of constructing an abstract. Tags comprise a form of community-generated metadata that provide important genre clues about the content of a Web page. By taking such tags into consideration when scoring fragments, the foregoing algorithm improves the ability of algorithm generator 216 to intelligently extract text from the Web page that best summarizes the Web page content.

1. Example Fragment Scoring Method in Accordance with an Embodiment of the Present Invention A particular method for performing step 408 of flowchart 400 will now be described. This method generates a relevancy score each fragment in the series of fragments that comprise the text content of a Web page. Assume that F represents a given fragment, L represents the tags associated with the Web page, T represents the title of the Web page, U represents a URL associated with the Web page, Q represents the query (or search terms) used to identify the Web page, and P represents the position of the fragment in the series of fragments. Then, the function for determining the relevancy score may be denoted:

$$Pr(F|L,T,U,Q,P)$$

which may also be described as the probability that F is relevant conditioned on L, T, U, Q and P.

Since abstract generation is performed at run time, reducing the amount of time required to generate the abstract is of particular importance. Therefore, it is desirable to reduce the complexity of the foregoing scoring function. In order to achieve this, a Beyesian conversion is performed and a naïve assumption made concerning the independence of each of the features L, T, U, Q and with respect to the relevancy of the fragment, so that:

$$Pr(F|L,T,U,Q,P) \approx Pr(L|F)*Pr(T|F)*Pr(U|F)*Pr(Q|F)*Pr(P|F).$$

Figure 5:
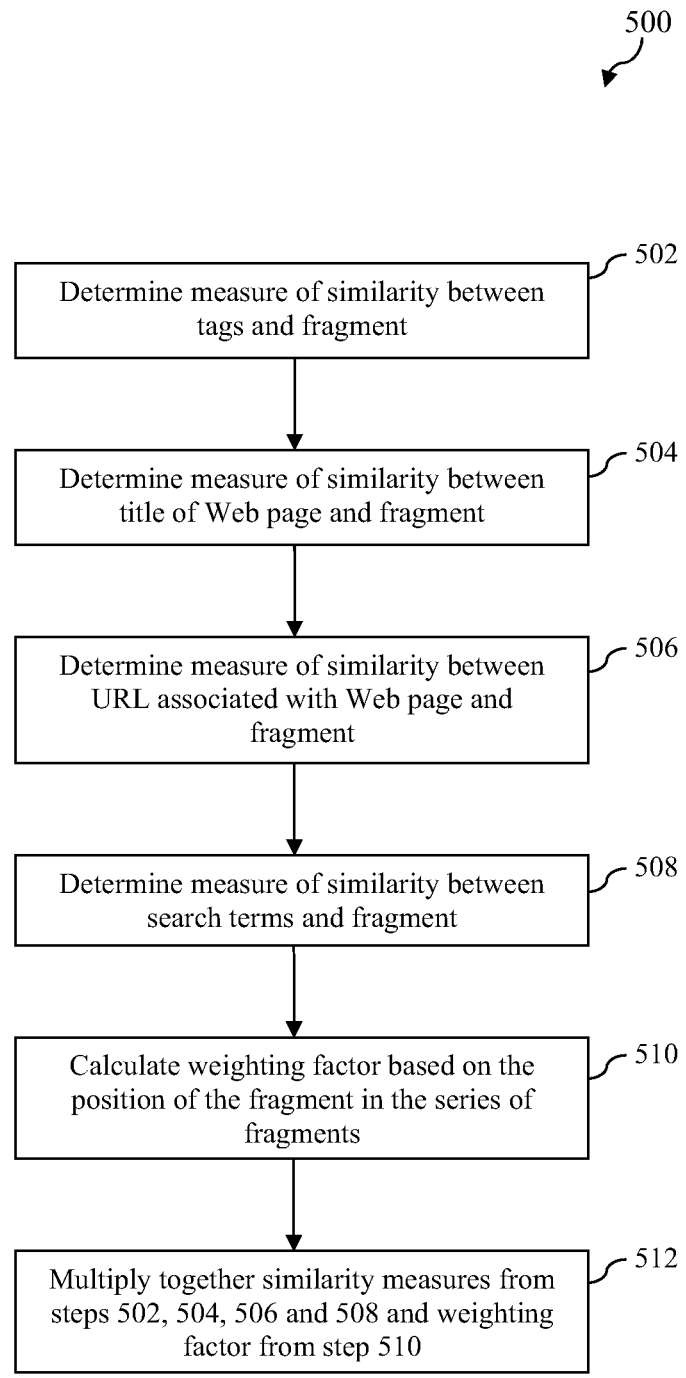
FIG. 5 depicts a flowchart of a method for generating a relevancy score for a fragment in a series of fragments that comprise the text content of a Web page in accordance with an embodiment of the present invention.

As will be described in more detail below, in an embodiment of the present invention, the probabilities $Pr(L|F)$, $Pr(T|F)$, $Pr(U|F)$ and $Pr(Q|F)$ are estimated by determining a measure of similarity between L and F, between T and F, between U and F and between Q and F, respectively, while the probability $Pr(P|F)$ is estimated by calculating a weighting factor based on the position of the fragment P in the series of fragments. These measures of similarity and the weighting factor are then multiplied together to generate the overall relevancy score for the fragment. FIG. 5 depicts a flowchart 500 of this particular method for generating a relevancy score for a fragment.

As shown in FIG. 5, the method of flowchart 500 begins at step 502, in which the probability $Pr(L|F)$ is estimated by determining a measure of similarity between the tags L and the fragment F. As noted above, tags L comprise a form of community-generated metadata that provide important genre clues about the content of a Web page. Accordingly, this algorithm increases the score assigned to fragments that are similar to the tags. A description of one manner in which this measure of similarity may be determined will be described in detail below with reference to flowchart 600 of FIG. 6.

At step 504, the probability $Pr(T|F)$ is estimated by determining a measure of similarity between the title T and the fragment F. The title of a Web page often includes terms that are representative of Web page content. Accordingly, this algorithm increases the score assigned to fragments that are similar to the title. In one embodiment, the measure of similarity is determined in accordance with:

$$Pr(T|F) \approx \alpha|T \bullet F|,$$

wherein $|T \bullet F|$ denotes the weighted intersection of T and F and $\alpha$ represents a predefined weighting factor. As will be appreciated by persons skilled in the relevant art(s), one manner of calculating the weighted intersection of T and F comprises normalizing the terms appearing in T and F (through the performance of functions such as stemming, spelling correction, case conversion, and the like), converting both T and F into weighted term vectors, and then computing an extended Jaccard coefficient for T and F However, other methods may also be used.

At step 506, the probability Pr(U|F) is estimated by determining a measure of similarity between the URL U associated with the Web page and the fragment F. Like the title, the URL associated with a Web page may also include terms that are representative of the content of the Web page, and so similarity to the URL will increase the score assigned to a fragment. In one embodiment, the measure of similarity is determined in accordance with:

$$Pr(U|F) \approx \beta |U \bullet F|,$$

wherein $|U \bullet F|$ is the weighted intersection of U and F and $\beta$ represents a predefined weighting factor. As will be appreciated by persons skilled in the relevant art(s), one manner of calculating the weighted intersection of U and F comprises using a segmentation algorithm to extract terms from the URL U, normalizing the terms appearing in U and F, converting both U and F into weighted term vectors, and then computing an extended Jaccard coefficient for U and F. However, other methods may also be used.

At step 508, the probability Pr(Q|F) is estimated by determining a measure of similarity between the search terms Q and the fragment F. The search terms Q are taken into account because, in addition to representing the content of a Web page, the abstract should also focus on those portions of a Web page in which the user is most interested. To achieve this, the algorithm increases the score assigned to fragments that are similar to the search terms. In one embodiment, the measure of similarity is determined in accordance with:

$$Pr(Q|F) \approx \delta |Q \bullet F|,$$

wherein $|Q \bullet F|$ is the weighted intersection of Q and F and $\delta$ represents a predefined weighting factor. As will be appreciated by persons skilled in the relevant art(s), one manner of calculating the weighted intersection of Q and F comprises normalizing the terms appearing in Q and F, converting both Q and F into weighted term vectors, and then computing an extended Jaccard coefficient for Q and F. However, other methods may also be used.

At step 510, the probability Pr(P|F) is estimated by calculating a weighting factor based on the position of the fragment in the series of fragments. It is assumed for the purposes of this algorithm that the closer a fragment is to the beginning of the Web page, the more likely it is that the fragment is representative of the content of the Web page. Consequently, an embodiment of the invention calculates the weighting factor so that larger weighting factors will be applied to fragments located at the beginning of the Web page. In one embodiment, for example, each fragment is assigned a numerical index that is representative of the position of the fragment in the series of fragments (e.g., the first fragment is assigned index 1, the second fragment is assigned index 2, and so on) and the weighting factor decreases as the index increases. For example, the weighting factor may decrease in a linear fashion as the index increases. Like the similarity measurements determined in preceding steps, this calculated weighting factor may also be multiplied a predefined weighting factor.

At step 512, the similarity measures determined in steps 502, 504, 506 and 508 and the weighting factor calculated in step 510 are multiplied together to generate the final relevancy score for the fragment.

Figure 6:
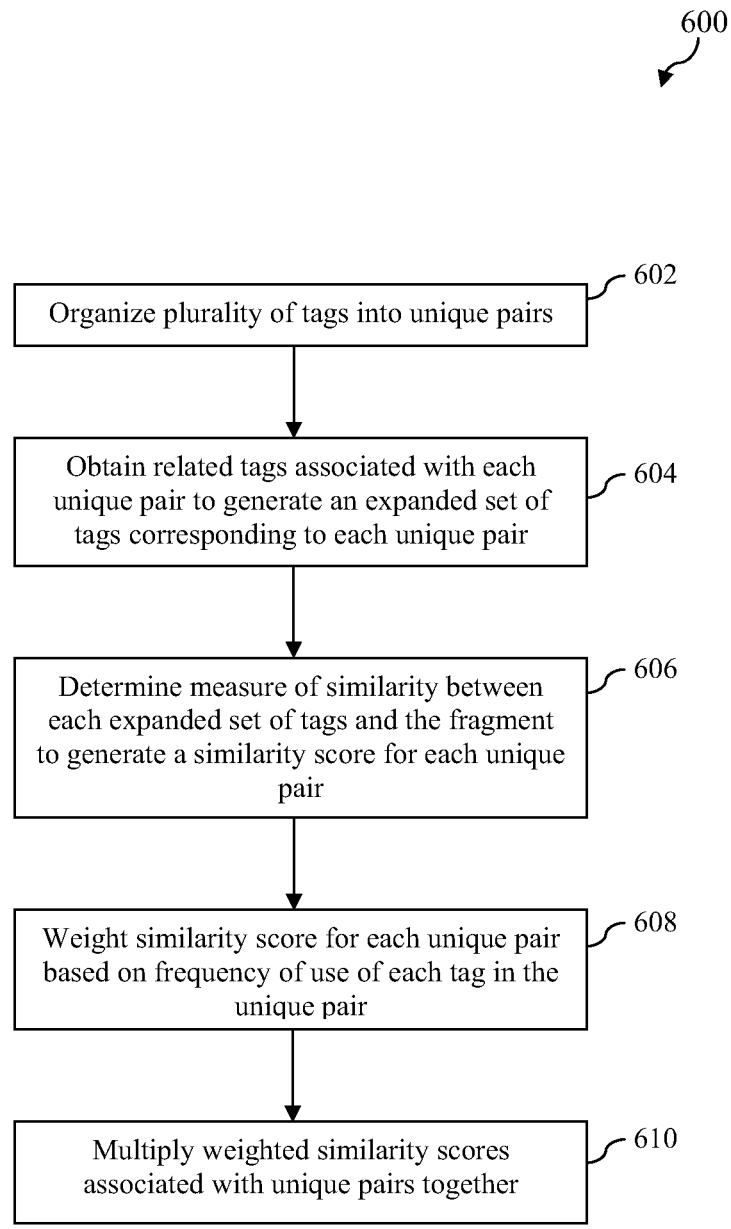
FIG. 6 depicts a flowchart of a method for determining a similarity measure between tags associated with a Web page and a fragment of the text content of the Web page in accordance with an embodiment of the present invention.

FIG. 6 depicts a flowchart 600 of a particular method for performing step 502 of flowchart 500—namely, determining a similarity measure between the tags L associated with the Web page and the fragment F. This method estimates the probability Pr(L|F) is estimated in accordance with:

$$Pr(L|F) \approx \Pi Pr(F|E(L_x,L_y))*Pr(L_x,L_y),$$

wherein $L_x$, and $L_y$, comprise a unique pair of tags within L and wherein $E(L_x,L_y)$ is an expansion function based on this unique pair of tags. One manner in which this equation may be solved will now be described in reference to the steps of flowchart 600.

As shown in FIG. 6, the method of flowchart 600 begins at step 602 in which the plurality tags L are organized into unique pairs of tags, denoted $(L_x,L_y)$. For example, if tags L were represented by the set of terms "Internet", "search" and "engine", the unique pairs $(L_x,L_y)$ would be (Internet, search), (Internet, engine) and (search, engine).

At step 604, an expansion function $E(L_x,L_y)$ is performed for each unique pair of tags $(L_x,L_y)$, wherein the expansion function obtains related tags associated with each unique pair to generate an expanded set of tags corresponding to each unique pair. The expansion function helps significantly in short-text scenarios in which the probability of an intersection between the tags and the fragment is low. The expansion function is performed for unique pairs because it has been observed that a single-tag expansion does not work as well as a multiple-tag expansion. However, the expansion function is limited to two tags to isolate the tags as much as possible for the purposes of factoring in their frequency of use in a manner that will be described below.

At step 606, a measure of similarity is determined between each expanded set of tags and the fragment to generate a similarity score for each unique pair $(L_x,L_y)$. This similarity score provides an estimate of $Pr(F|E(L_x,L_y))$ for each unique pair $(L_x,L_y)$. In one embodiment, the measure of similarity is determined by obtaining the weighted intersection of F and $E(L_x,L_y)$ for each unique pair $(L_x,L_y)$. The weighted intersection may be obtained, for example, by normalizing the terms appearing in $E(L_x,L_y)$ and F, converting both $E(L_x,L_y)$ and F into weighted term vectors, and then computing an extended Jaccard coefficient for $E(L_x,L_y)$ and F. However, other methods may also be used.

At step 608, the similarity score for each unique pair $(L_x, L_y)$ is weighted based on frequency of use information associated with each tag in the unique pair. As discussed above, abstract generator 216 obtains frequency of use information from tags database 208, wherein such frequency of use information indicates the number of unique users that have assigned a given tag to the Web page. This step is used to ensure that tags that were most often applied to the Web site are factored more heavily into determining the tag-based similarity measure. In one embodiment, this step involves estimating the weighting factor $Pr(L_x,L_y)$ in the foregoing equation by summing the number of times the tags $L_x$, and $L_y$, were applied by a unique user to the Web page and then dividing that sum by the sum of the number of time all the tags in the set L were applied to the Web page. For example, if L consists of the tags Internet, search, and engine, and the frequency of use of those tags is 6, 9, and 5, respectively, then the weighting factor for the pair (Internet, search) would be calculated as (6+9)/(6+9+5)=0.75. The weighting factor associated with each unique pair is then multiplied by the corresponding similarity score for each unique pair to generate a weighted similarity score for each unique pair.

At step 610, the weighted similarity scores for all the unique pairs are multiplied together (as denoted by the symbol Π in the foregoing equation) to arrive at the similarity measure between the tags L associated with the Web page and the fragment F.

2. Example Fragment Selection Method in Accordance with an Embodiment of the Present Invention A particular method for performing step 410 of flowchart 400 will now be described. In particular, a particular method for selecting one or more fragments from the series of fragments based on the relevancy score associated with each fragment will now be described. In accordance with this method, the function $$\Sigma \, \text{score}(F_i)$$

is maximized subject to the condition that $$n \geq \Sigma \, \text{length}(F_i) + \text{penalty},$$

wherein $\Sigma \, \text{score}(F_i)$ is the sum of the scores associated with the selected fragment(s), n is a predetermined abstract length, $\Sigma \, \text{length}(F_i)$ is the sum of the number of characters in the selected fragment(s) and penalty is a penalty amount associated with selecting non-contiguous fragments in the series of fragments. For example, penalty may be an amount that is initialized to zero and then incremented by 5, every time there is a skip between selected fragments. This penalty amount may be incurred, for example to insert the characters " . . . " within the body of the abstract.

As will be appreciated by persons skilled in the relevant art(s), the foregoing problem is a 0-1, knapsack problem (NP-Hard) which is computationally expensive to solve. However an embodiment of the present invention addresses this issue by using a linear programming solver that performs an approximation to solve the problem quickly and accurately. This is important because, as noted above, the abstract generation algorithm may be performed at run time.

C. Example Computer System Implementations

Figure 7:
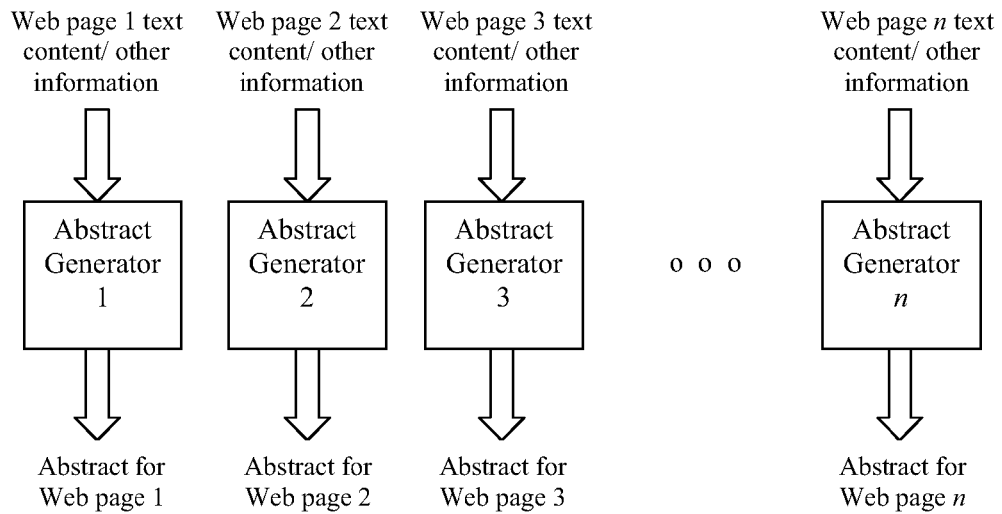
FIG. 7 is a block diagram of a plurality of abstract generators operating in parallel in accordance with an embodiment of the present invention.

Embodiments of the present invention may advantageously be implemented by computer programs operating in parallel to increase the speed by which search query resolution and abstract generation are performed. For example, because search engine 214 generates a plurality of results associated with a particular user query, abstract generation for each result may be performed in parallel. This is illustrated in FIG. 7, which shows a block diagram of a plurality of abstract generators 700 operating in parallel. Each abstract generator operates to receive text content associated with a unique Web page identified during a search and other information associated with the identified Web page (e.g., tags and associated frequencies of use, title, URL, search terms) and operates independently to generate an abstract for the identified Web page. Each of the plurality of abstract generators 700 may be running on the same or different machines.

Figure 8:
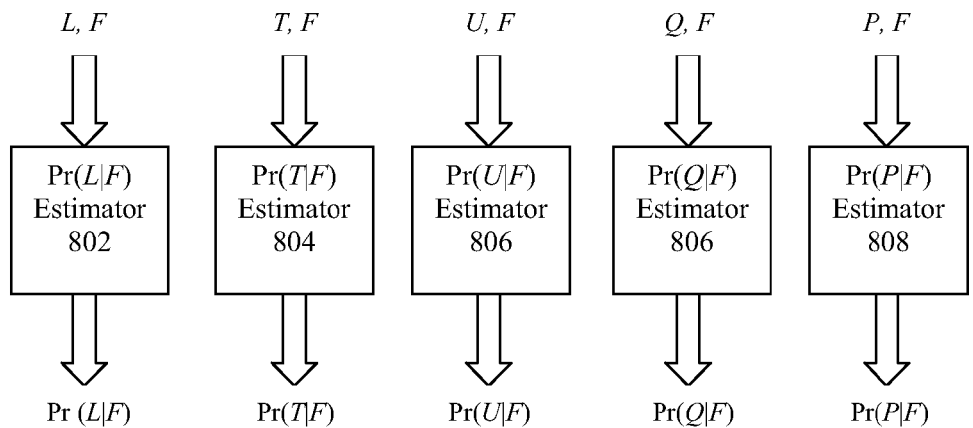
FIG. 8 is a block diagram of a plurality of probability estimators operating in parallel in accordance with an embodiment of the present invention.

Additionally, in an abstract generator that scores fragments in a manner consistent with that described above in reference to flowchart 400 of FIG. 4, the estimation of the different probabilities that are used to score a particular fragment may be performed in parallel. This is illustrated in FIG. 8, which shows a block diagram of a plurality of probability estimators 800 operating in parallel. As shown in FIG. 8, probability estimators 800 includes a Pr(L|F) estimator 802, a Pr(T|F) estimator 804, a Pr(U|F) estimator 806, a Pr(Q|F) estimator 808 and a Pr(P|F) estimator 810, each of which operates independently to generate its own respective probability for fragment F. As discussed above, these probabilities may then be multiplied together to generate an overall relevancy score for fragment F. Each of the probability estimators may be running on the same or different machines.

As should be apparent from the foregoing, a search engine and an abstract generator in accordance with an embodiment of the present invention, or any portion or component thereof, may be implemented in software by any well-known processor-based computer system. An example of such a computer system 900 is depicted in FIG. 9.

Figure 9:
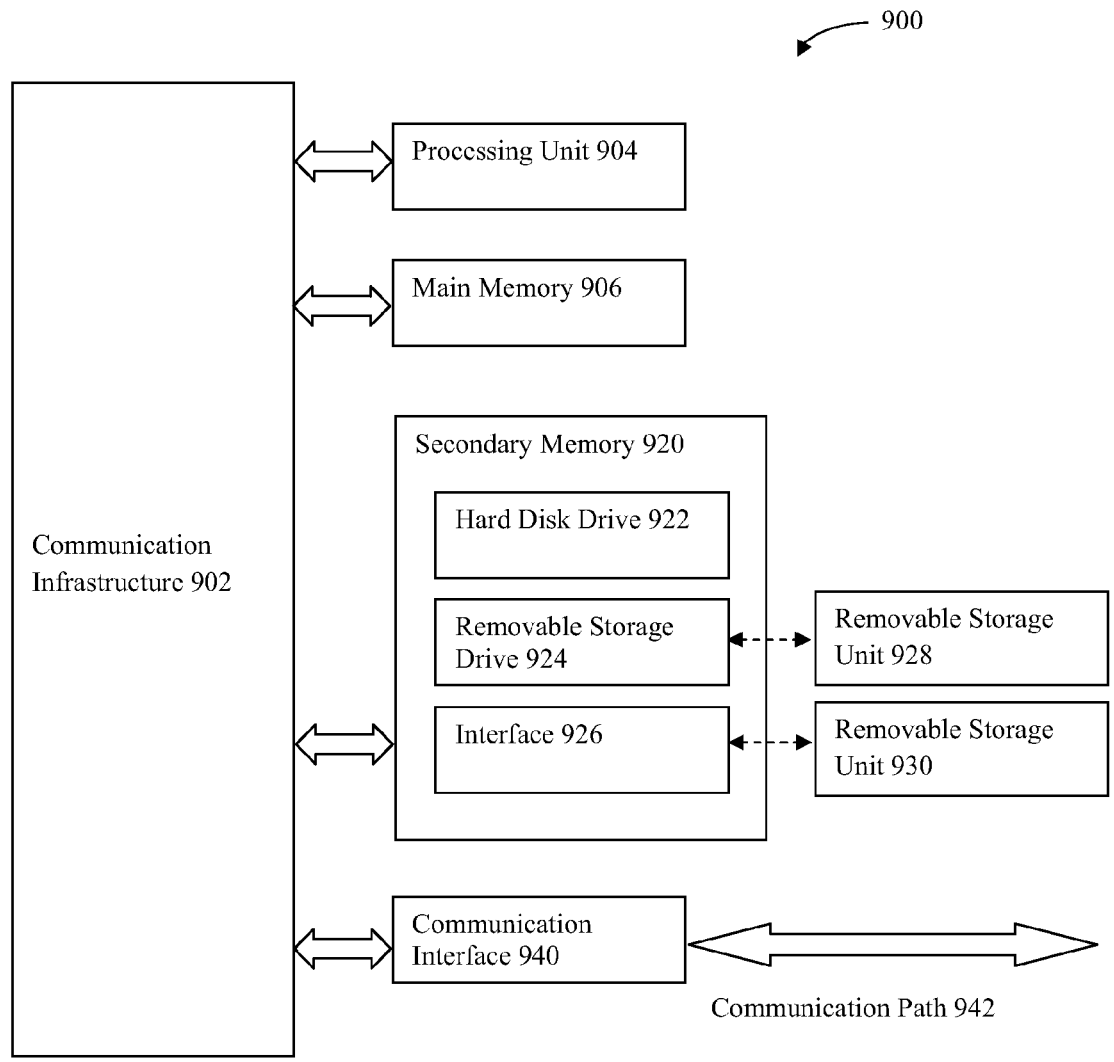
FIG. 9 is a block diagram of an example computer system that may be used to implement aspects of the present invention.

As shown in FIG. 9, computer system 900 includes a processing unit 904 that includes one or more processors. Processor unit 904 is connected to a communication infrastructure 902, which may comprise, for example, a bus or a network.

Computer system 900 also includes a main memory 906, preferably random access memory (RAM), and may also include a secondary memory 920. Secondary memory 920 may include, for example, a hard disk drive 922, and/or a removable storage drive 924. Removable storage drive 924 may comprise a floppy disk drive, a magnetic tape drive, an optical disk drive, a flash memory, or the like. Removable storage drive 924 reads from and/or writes to a removable storage unit 928 in a well-known manner. Removable storage unit 928 may comprise a floppy disk, memory stick, magnetic tape, optical disk, or the like, which is read by and written to by removable storage drive 924. As will be appreciated by persons skilled in the relevant art(s), removable storage unit 928 includes a computer usable storage medium having stored therein computer software and/or data.

In alternative implementations, secondary memory 920 may include other similar means for allowing computer programs or other instructions to be loaded into computer system 900. Such means may include, for example, a removable storage unit 930 and an interface 926. Examples of such means may include a program cartridge and cartridge interface (such as that found in video game devices), a removable memory chip (such as an EPrOM, or PrOM) and associated socket, and other removable storage units 930 and interfaces 926 which allow software and data to be transferred from the removable storage unit 930 to computer system 900.

Computer system 900 may also include a communications interface 940. Communications interface 940 allows software and data to be transferred between computer system 900 and external devices. Examples of communications interface 940 may include a modem, a network interface (such as an Ethernet card), a communications port, a PCMCIA slot and card, or the like. Software and data transferred via communications interface 940 are in the form of signals which may be electronic, electromagnetic, optical, or other signals capable of being received by communications interface 940. These signals are provided to communications interface 940 via a communications path 942. Communications path 942 carries signals and may be implemented using wire or cable, fiber optics, a phone line, a cellular phone link, an RF link and other communications channels.

As used herein, the terms "computer program medium" and "computer usable medium" are used to generally refer to media such as removable storage unit 928, removable storage unit 930, a hard disk installed in hard disk drive 922, and signals received by communications interface 940. Computer program medium and computer useable medium can also refer to memories, such as main memory 906 and secondary memory 920, which can be semiconductor devices (e.g., DRAMs, etc.). These computer program products are means for providing software to computer system 900.

Computer programs (also called computer control logic, programming logic, or logic) are stored in main memory 906 and/or secondary memory 920. Computer programs may also be received via communications interface 940. Such computer programs, when executed, enable the computer system 900 to implement features of the present invention as discussed herein. Accordingly, such computer programs represent controllers of the computer system 900. Where the invention is implemented using software, the software may be stored in a computer program product and loaded into computer system 900 using removable storage drive 924, interface 926, or communications interface 940.

The invention is also directed to computer program products comprising software stored on any computer useable medium. Such software, when executed in one or more data processing devices, causes a data processing device(s) to operate as described herein. Embodiments of the present invention employ any computer useable or readable medium, known now or in the future. Examples of computer useable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

D. Additional/Alternative Implementations

In an embodiment described above, a scoring function is used to calculate a score for each fragment in a series of fragments that comprise the text content of a Web page. The score assigned to each fragment is then used to determine whether the fragment should be used to generate an abstract for the Web page. In one implementation of the present invention, the scoring function is generated by a machine learning algorithm. The machine learning algorithm is configured to receive a collection of training data instances, wherein each training data instance includes a fragment, a plurality of features associated with a Web page from which the fragment was extracted, and a corresponding score, and to generate a function therefrom. Thus, if the fragment and the features associated with the Web page from which it was extracted are generally denoted x and the corresponding score is denoted y, then the machine learning algorithm will generate a function $f(x)$ that returns the corresponding score y for each training data instance. This function $f(x)$ can then be applied to other fragments outside of those represented by the training data instances. Thus, given a sufficiently large collection of training data instances that accurately assign relevancy scores to fragments, a high-quality scoring function can be generated which may then advantageously be used for abstract generation.

The features that may be included in the training data instances and to which the function $f(x)$ may be applied may include any of the features discussed above, such as tags or other community metadata associated with a Web page, a title of a Web page, a URL associated with a Web page, a query (or search terms) used to identify a Web page. The features may also include other information, including but not limited to editorial scores associated with a Web page, Web page anchor text, or DMOZ results.

Another embodiment of the present invention addresses the issue of Web pages for which tags or other community metadata are unavailable by extending tags to Web pages that do not have them. For example, if an abstract must be generated for a Web page for which tags are unavailable, one embodiment of the present invention may assign tags to the Web page, wherein the assigned tags are associated with one or more other Web pages that are deemed relevant to the Web page. One way of implementing this would be to obtain the tags for all Web pages that link to a given Web page A, wherein Web page A does not have any tags of its own. In this instance, the common tags associated with each of the Web pages containing inbound links to Web page A may be used as the tags for Web page A.

In another embodiment, a classifier may be used to generate tags for the Web page, wherein the classifier is trained using tags assigned by users to other Web pages. This classifier could then be used to return tags for any Web page. Such an embodiment would advantageously allow the foregoing technique for abstract generation based on community metadata to be applied to any Web page, regardless of whether community metadata exists for a Web page.

E. Conclusion

While various embodiments of the present invention have been described above, it should be understood that they have been presented by way of example only, and not limitation. For example, although embodiments of the present invention described above generate abstracts for Web pages, persons skilled in the relevant art(s) will readily appreciate that the present invention may be used to generate abstracts for any type of document that includes text. Additionally, although embodiments of the present invention are described above in the context of an Internet search engine, persons skilled in the relevant art(s) will appreciate that the present invention may be implemented in any type of search engine. Still further, although embodiments of the present invention use tags to generate abstracts, persons skilled in the relevant art(s) will readily appreciate that other types of community-generated metadata may be used to generate abstracts and that the present invention is not limited to the use of tags only.

Figure 10:
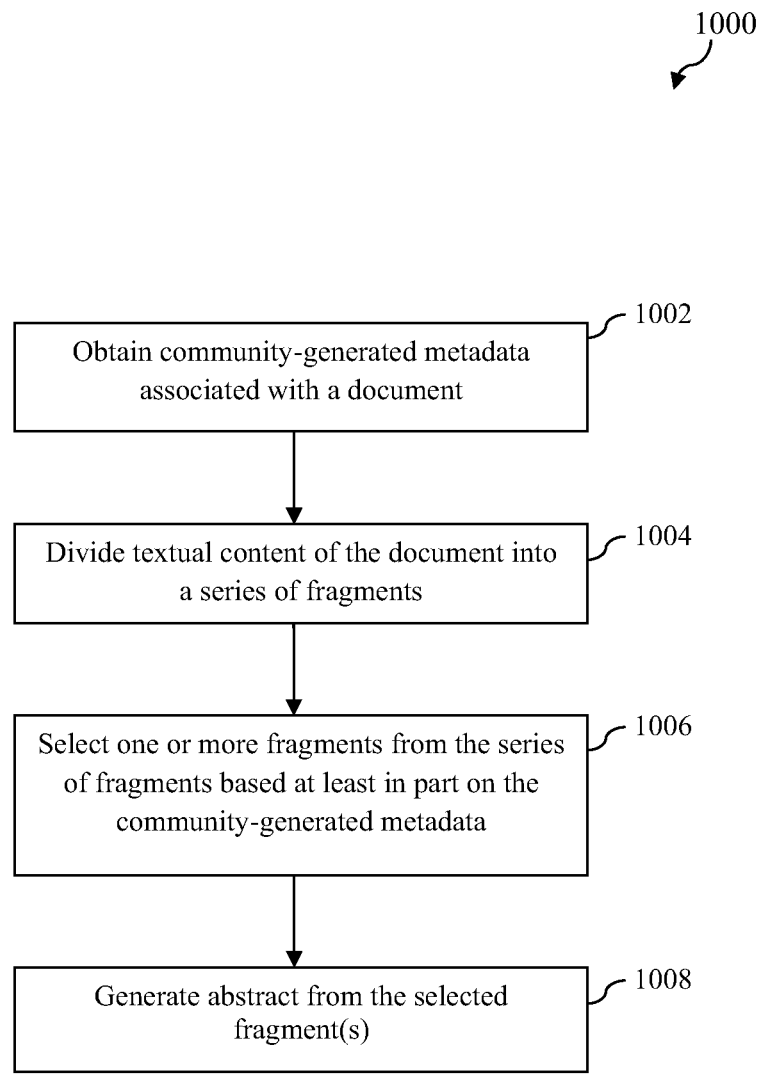
FIG. 10 depicts a flowchart of a general method for generating an abstract associated with a document in accordance with an embodiment of the present invention.

By way of illustration, FIG. 10 depicts a flowchart 1000 of a general method for generating an abstract for a document in accordance with an embodiment of the present invention. As shown at FIG. 10, the flowchart 1000 begins at step 1002, in which community-generated metadata associated with a document is obtained. At step 1004, the textual content of the document is divided into a series of fragments. At step 1006, one or more fragments from the series of fragments are selected based at least in part on the community-generated metadata. At step 1008, the abstract is generated from the selected fragment(s).

It will be understood by those skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method implemented on a machine having at least one processor, storage, and a communication platform connected to a network for generating an abstract associated with a web page, comprising:

obtaining a plurality of bookmarking tags collected via a bookmarking Web service associated with the web page from a database, the bookmarking Web service being configured to allow users to store bookmarks associated with the web page and share the bookmarks with other users;

determining a subject matter associated with the web page based on the plurality of bookmarking tags;

dividing textual content of the web page into a series of fragments each of which is associated with a topic that has a measure of similarity relative to the subject matter;

selecting one or more fragments from the series of fragments of the web page, wherein
the one or more fragments are associated with one or more topics, and
the one or more topics have maximum measures of similarity relative to the subject matter;

and
generating the abstract associated with the web page from the selected one or more fragments of the web page.

2. The method of claim 1, further comprising:
identifying the web page responsive to a user query.

3. The method of claim 1, wherein selecting the one or more fragments from the series of fragments of the web page comprises:
determining the measure of similarity between the plurality of bookmarking tags and each fragment in the series of fragments of the web page, wherein the plurality of bookmarking tags is a plurality of social bookmarking tags;
calculating a score for each fragment in the series of fragments of the web page based at least in part on the measure of similarity between the plurality of social bookmarking tags and the fragment; and
selecting one or more fragments from the series of fragments of the web page based at least in part on the score associated with each fragment in the series of fragments of the web page.

4. The method of claim 3, wherein calculating a score for each fragment in the series of fragments of the web page based at least in part on the measure of similarity between the plurality of social bookmarking tags and the fragment comprises:
calculating a score for each fragment in the series of fragments of the web page based on the measure of similarity between the plurality of social bookmarking tags and the fragment and one or more of:
a measure of similarity between a title associated with the web page and the fragment;
a measure of similarity between a Uniform Resource Locator (URL) associated with the web page and the fragment;
a measure of similarity between search terms used to identify the web page and the fragment; and
a weighting factor associated with the position of the fragment in the series of fragments of the web page.

5. The method of claim 3, wherein determining a measure of similarity between the plurality of social bookmarking tags and each fragment in the series of fragments of the web page comprises:
determining a measure of similarity between the plurality of social bookmarking tags associated with the web page and a fragment in the series of fragments of the web page, wherein each social bookmarking tag in the plurality of social bookmarking tags comprises a text descriptor assigned by one or more users to the web page.

6. The method of claim 5, wherein determining a measure of similarity between the plurality of social bookmarking tags associated with the web page and the fragment comprises:
organizing the plurality of social bookmarking tags into unique pairs;
obtaining related social bookmarking tags associated with each of the unique pairs to generate an expanded set of social bookmarking tags corresponding to each of the unique pairs;
determining a measure of similarity between each expanded set of social bookmarking tags and the fragment to generate a similarity score for each of the unique pairs; and
multiplying the similarity scores for each of the unique pairs together.

7. The method of claim 6, wherein determining a measure of similarity between the plurality of social bookmarking tags associated with the web page and the fragment further comprises:

obtaining a frequency of use associated with each social bookmarking tag in the plurality of social bookmarking tags; and
weighting the similarity score for each of the unique pairs based on the frequency of use associated with each social bookmarking tag in the unique pair.

8. The method of claim 3, wherein selecting the one or more fragments from the series of fragments of the web page based at least in part on the score associated with each fragment comprises:
selecting one or more fragments from the series of fragments of the web page that maximize a sum of the scores associated with the selected one or more fragments subject to the condition that a sum of a number of characters in the selected one or more fragments plus a penalty amount associated with selecting non-contiguous fragments in the series of fragments of the web page does not exceed a predetermined abstract length.

9. A system comprising:
one or more processors;
a database that stores bookmarking tags associated with a plurality of web pages, wherein the bookmarking tags stored in the database are collected via a bookmarking Web service that is configured to allow users to store bookmarks associated with the web page and share the bookmarks with other users; and
a search engine, at least partially executed by at least one of the one or more processors, comprising
a document identifier configured to identify a web page responsive to a user query, and
an abstract generator configured to:
obtain a plurality of bookmarking tags associated with the identified web page from the database,
determine a subject matter associated with the web page based on the plurality of bookmarking tags,
divide textual content of the identified web page into a series of fragments each of which is associated with a topic that has a measure of similarity relative to the subject matter,
select one or more fragments from the series of fragments of the web page, wherein
the one or more fragments are associated with one or more topics, and
the one or more topics have maximum measures of similarity relative to the subject matter, and
user interface logic configured to present the abstract associated with the identified web page to a user.

10. The system of claim 9, wherein the abstract generator is configured to determine the measure of similarity between the obtained bookmarking tags and each fragment in the series of fragments of the web page, wherein the bookmarking tags are social bookmarking tags, to calculate a score for each fragment in the series of fragments of the web page based at least in part on the measure of similarity between the obtained social bookmarking tags and the fragment, and to select one or more fragments from the series of fragments of the web page based at least in part on the score associated with each fragment in the series of fragments of the web page.

11. The system of claim 10, wherein the abstract generator is configured to calculate a score for each fragment in the series of fragments of the web page based on the measure of similarity between the obtained social bookmarking tags and the fragment and one or more of:
a measure of similarity between a title associated with the identified web page and the fragment;

a measure of similarity between a Uniform Resource Locator (URL) associated with the identified web page and the fragment;

a measure of similarity between search terms used to identify the identified web page and the fragment; and a weighting factor associated with the position of the fragment in the series of fragments of the web page.

12. The system of claim 10, wherein each social bookmarking tag in the plurality of social bookmarking tags comprises a text descriptor assigned by one or more users to the identified web page.

13. The system of claim 12, wherein the abstract generator is configured to determining a measure of similarity between the plurality of social bookmarking tags associated with the identified web page and a fragment by organizing the plurality of social bookmarking tags into unique pairs, obtaining related social bookmarking tags associated with each of the unique pairs to generate an expanded set of social bookmarking tags corresponding to each of the unique pairs, determining a measure of similarity between each expanded set of social bookmarking tags and the fragment to generate a similarity score for each of the unique pairs, and multiplying the similarity scores for each of the unique pairs together.

14. The system of claim 13, wherein the abstract generator is further configured to determine the measure of similarity between the plurality of social bookmarking tags associated with the identified web page and the fragment by obtaining a frequency of use associated with each social bookmarking tag in the plurality of social bookmarking tags and by weighting the similarity score for each of the unique pairs based on the frequency of use associated with each social bookmarking tag in the unique pair.

15. The system of claim 10, wherein the abstract generator is configured to select the one or more fragments from the series of fragments of the web page that maximize a sum of the scores associated with the selected one or more fragments subject to the condition that a sum of a number of characters in the selected one or more fragments plus a penalty amount associated with selecting non-contiguous fragments in the series of fragments of the web page does not exceed a predetermined abstract length.

16. A machine-readable tangible and non-transitory medium having information for enabling a processing unit to generate an abstract associated with a web page, wherein the information, when read by the machine, causes the machine to perform the following:

enabling the processing unit to obtain a plurality of bookmarking tags collected via a bookmarking Web service associated with the web page from a database, the bookmarking Web service being configured to allow users to store bookmarks associated with the web page and share the bookmarks with other users;

enabling the processing unit to determine a subject matter associated with the web page based on the plurality of bookmarking tags;

enabling the processing unit to divide textual content of the web page into a series of fragments each of which is associated with a topic that has a measure of similarity relative to the subject matter;

enabling the processing unit to select one or more fragments from the series of fragments of the web page, wherein the one or more fragments are associated with one or more topics, and the one or more topics have maximum measures of similarity relative to the subject matter; and enabling the processing unit to generate the abstract associated with the web page from the selected one or more fragments of the web page.

17. The medium of claim 16, wherein the information, when read by the machine, further causes the machine to perform the following:

enabling the processing unit to identify the web page responsive to a user query.

18. The medium of claim 16, wherein the step of enabling the processing unit to select one or more fragments from the series of fragments of the web page comprises:

enabling the processing unit to determine the measure of similarity between the plurality of bookmarking tags and each fragment in the series of fragments of the web page, wherein the plurality of bookmarking tags is a plurality of social bookmarking tags;

enabling the processing unit to calculate a score for each fragment in the series of fragments of the web page based at least in part on the measure of similarity between the plurality of social bookmarking tags and the fragment; and enabling the processing unit to select one or more fragments from the series of fragments of the web page based at least in part on the score associated with each fragment in the series of fragments of the web page.

19. The medium of claim 18, wherein the step of enabling the processing unit to calculate a score for each fragment in the series of fragments of the web page based at least in part on the measure of similarity between the plurality of social bookmarking tags and the fragment comprises:

enabling the processing unit to calculate a score for each fragment in the series of fragments of the web page based on the measure of similarity between the plurality of social bookmarking tags and the fragment and one or more of:

a measure of similarity between a title associated with the web page and the fragment;

a measure of similarity between a Uniform Resource Locator (URL) associated with the web page and the fragment;

a measure of similarity between search terms used to identify the web page and the fragment; and a weighting factor associated with the position of the fragment in the series of fragments of the web page.

20. The medium of claim 18, wherein the step of enabling the processing unit to determine a measure of similarity between the plurality of social bookmarking tags and each fragment in the series of fragments of the web page comprises:

enabling the processing unit to determine a measure of similarity between the plurality of social bookmarking tags associated with the web page and a fragment, wherein each social bookmarking tag in the plurality of social bookmarking tags comprises a text descriptor assigned by one or more users to the web page.

21. The medium of claim 20, wherein the step of enabling the processing unit to determine a measure of similarity between the plurality of social bookmarking tags associated with the web page and the fragment comprises:

enabling the processing unit to organize the plurality of social bookmarking tags into unique pairs;

enabling the processing unit to obtain related social bookmarking tags associated with each of the unique pairs to generate an expanded set of social bookmarking tags corresponding to each of the unique pairs;

enabling the processing unit to determine a measure of similarity between each expanded set of social bookmarking tags and the fragment to generate a similarity score for each of the unique pairs; and enabling the processing unit to multiply the similarity scores for each of the unique pairs together.

22. The medium of claim 21, wherein the step of enabling the processor to determine a measure of similarity between the plurality of social bookmarking tags associated with the web page and the fragment further comprises:

enabling the processing unit to obtain a frequency of use associated with each social bookmarking tag in the plurality of social bookmarking tags; and enabling the processing unit to weight the similarity score for each of the unique pairs based on the frequency of use associated with each social bookmarking tag in the unique pair.

23. The medium of claim 18, wherein the step of enabling the processing unit to select the one or more fragments from the series of fragments of the web page based at least in part on the score associated with each fragment comprises:

enabling the processing unit to select one or more fragments from the series of fragments of the web page that maximize a sum of the scores associated with the selected one or more fragments subject to the condition that a sum of a number of characters in the selected one or more fragments plus a penalty amount associated with selecting non-contiguous fragments in the series of fragments of the web page does not exceed a predetermined abstract length.

24. A method for generating an abstract associated with a web page, comprising:

obtaining a plurality of bookmarking tags collected via a bookmarking Web service associated with the web page from a database, wherein the bookmarking Web service is configured to allow users to store bookmarks associated with the web page and share the bookmarks with other users, and wherein each bookmarking tag in the plurality of bookmarking tags comprises a text descriptor assigned to the web page;

determining a subject matter associated with the web page based on the plurality of bookmarking tags;

dividing textual content of the web page into a series of fragments of the web page each of which is associated with a topic;

applying a scoring function to each fragment in the series of fragments to calculate a score for each fragment, wherein the scoring function is based at least in part on a measure of similarity between the subject matter and the topic associated with the fragment;

selecting one or more fragments in the series of fragments of the web page based on the score calculated for each fragment, wherein the one or more fragments have maximum scores among the series of fragments; and generating the abstract associated with the web page from the selected one or more fragments of the web page.

25. The method of claim 24, further comprising:

generating the scoring function using a machine learning algorithm.

26. The method of claim 24, wherein obtaining a plurality of bookmarking tags associated with the web page comprises:

assigning bookmarking tags to the web page, wherein the assigned bookmarking tags are associated with one or more additional web pages that are deemed relevant to the web page.

27. The method of claim 24, wherein obtaining a plurality of bookmarking tags associated with the web page comprises:

using a classifier to generate the plurality of bookmarking tags associated with the web page, wherein the classifier is trained using bookmarking tags assigned by users to other web pages.

28. The method of claim 1, wherein the one or more fragments are selected from the series of fragments of the web page for maximizing a sum of the measures of similarity between each of the selected one or more fragments and the plurality of bookmarking tags.

* * * * *